United States Patent [19]

Fukada et al.

[11] Patent Number: 6,143,584
[45] Date of Patent: Nov. 7, 2000

[54] METHOD FOR FABRICATION OF A SEMICONDUCTOR SENSOR

[75] Inventors: Tsuyoshi Fukada, Aichi-gun; Masakazu Kanosue, Nagoya; Kenichi Ao, Tokai; Minoru Murata, Kariya; Seiichiro Ishio, Handa, all of Japan

[73] Assignee: Denso Corporation, Kariya, Japan

[21] Appl. No.: 09/121,893

[22] Filed: Jul. 24, 1998

[30] Foreign Application Priority Data

Jul. 25, 1997 [JP] Japan ................................ 9-200179
Aug. 21, 1997 [JP] Japan ................................ 9-225175

[51] Int. Cl.[7] ................................................. H01L 21/00
[52] U.S. Cl. ........................... 438/50; 438/48; 73/514.16
[58] Field of Search .................................. 438/48, 64, 68, 438/385, 973, 50; 437/15, 901, 921; 205/656

[56] References Cited

U.S. PATENT DOCUMENTS

| 4,613,230 | 9/1986 | Iwai . | |
|---|---|---|---|
| 5,643,803 | 7/1997 | Fukada et al. | 437/15 |
| 5,900,631 | 5/1999 | Sano | 250/338.4 |

FOREIGN PATENT DOCUMENTS

| 2-101729 | 4/1990 | Japan . |
|---|---|---|
| 2-246312 | 10/1990 | Japan . |
| 3-268466 | 11/1991 | Japan . |
| 4-043358 | 2/1992 | Japan . |
| 4-25256 | 2/1992 | Japan . |
| 5-175093 | 7/1993 | Japan . |
| 5-315207 | 11/1993 | Japan . |
| 5-347350 | 12/1993 | Japan . |
| 6-196534 | 7/1994 | Japan . |
| 6-216265 | 8/1994 | Japan . |
| 6-302833 | 10/1994 | Japan . |

*Primary Examiner*—Amir Zarabian
*Assistant Examiner*—Bradley K Smith
*Attorney, Agent, or Firm*—Pillsbury Madison & Sutro Intellectual Property Group

[57] ABSTRACT

A semiconductor sensor has gauge resistors. The gauge resistors connect with aluminum electrodes through contact holes, and form a bridge circuit. The gauge resistors are formed on each chip area of a semiconductor substrate before dicing the chip areas. Then, the resistances of the gauge resistors or the output of the bridge circuit are measured. Contact positions of the gauge resistors or the size and/or shape of the contact holes are adjusted based on the result of the measurement in order to adjust the offset voltage of the bridge circuit formed on each chip area.

42 Claims, 15 Drawing Sheets

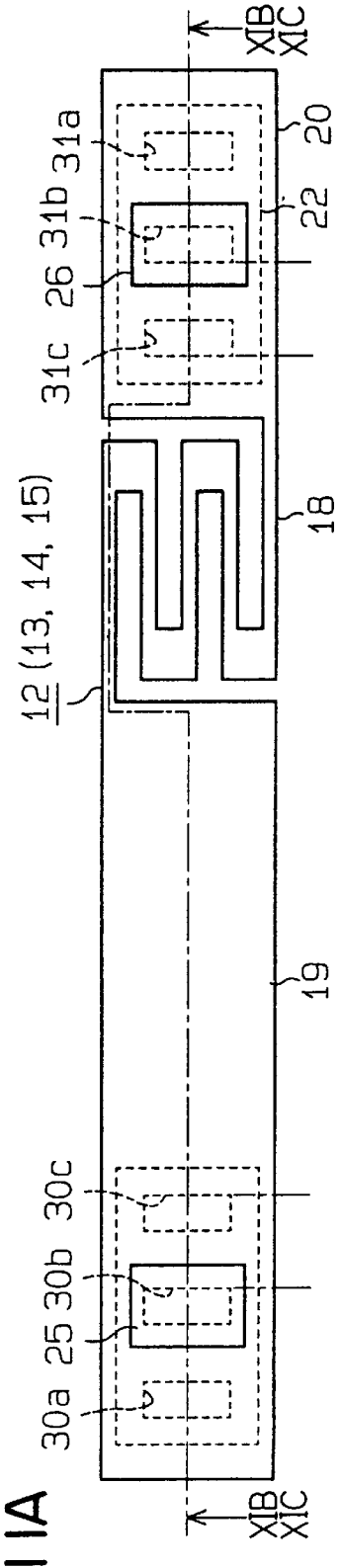
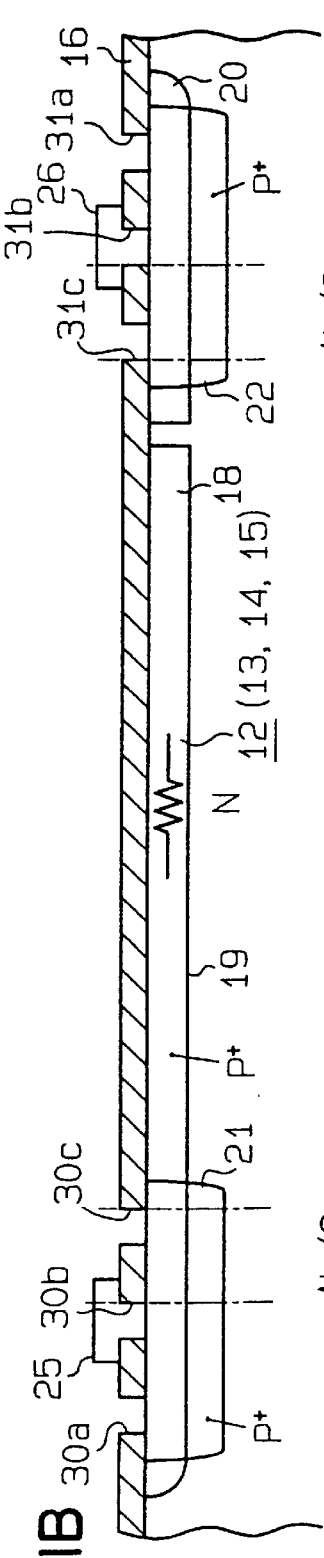
FIG. 11A
FIG. 11B
FIG. 11C

METHOD FOR FABRICATION OF A SEMICONDUCTOR SENSOR

CROSS REFERENCE TO RELATED APPLICATIONS

This application is based upon and claims priority from Japanese Patent Application Nos. Hei 9-200179 filed on Jul. 25, 1997, and Hei 9-225175 filed on Aug. 21, 1997, the contents of which are incorporated herein by reference.

BACKGROUND OF THE INVENTION

1. Field of the Invention

The present invention relates to a method for fabrication of a semiconductor sensor including a gauge resistor.

2. Related Art

JP-U-4-25256 discloses a semiconductor pressure sensor including a bridge circuit formed by a plurality of gauge resistors on a substrate. This publication teaches a technique which makes an offset voltage of the bridge circuit zero. In order to make the offset voltage zero, transcription of the gauge can be improved by arranging the gauge resistors and dummy patterns in a line on the substrate. However, the disclosed technique makes the offset voltage zero only in the single semiconductor chip to which the technique is applied. With the described technique, it is impossible to remove the influence of photo masks used for patterning the gauge resistors (an impurity diffusion layer). That is, the described technique can decrease the non-uniformity of resistance caused by photo or diffusion processes. In contrast, it is impossible to decrease the non-uniformity of width of a gauge mask used for patterning the gauge reisistors (a kind of photo mask).

SUMMARY OF THE INVENTION

The present invention is made in light of the foregoing problems, and it is an object of the present invention to provide a method for fabricating a semiconductor sensor, which causes the offset voltage to be zero despite non-uniformity of width of a gauge mask used for patterning gauge resistors.

According to the present invention, a gauge resistor of a semiconductor sensor is formed on each of a plurality of chip areas of a semiconductor substrate. The gauge resistor has a contact portion to electrically contact an electrode. The resistance of the gauge resistor is measured, then the contact portion of the gauge resistor is adjusted based on the resistance of the gauge resistor. As a result, the offset voltage approaches zero.

BRIEF DESCRIPTION OF THE DRAWINGS

Other features and advantages of the present invention will be appreciated, as well as method of operation and the function of the related parts, from a study of the following detailed description, the appended claims, and the drawings, all of which form a part of this application. In the drawings:

FIG. 11A is a detailed plan view of a further modification of the area surrounding gauge resistor;

FIG. 11B is a detailed XI—XI cross sectional view of the gauge resistor shown in FIG. 11A before adjusting the offset voltage;

FIG. 11C is a detailed XI—XI cross sectional view of the gauge resistor shown in FIG. 11A after adjusting the offset voltage;

DETAILED DESCRIPTION OF THE PREFERRED EMBODIMENTS

Preferred embodiments of the present invention are now described in detail with reference to drawings.

(First Embodiment)

Figure 1:
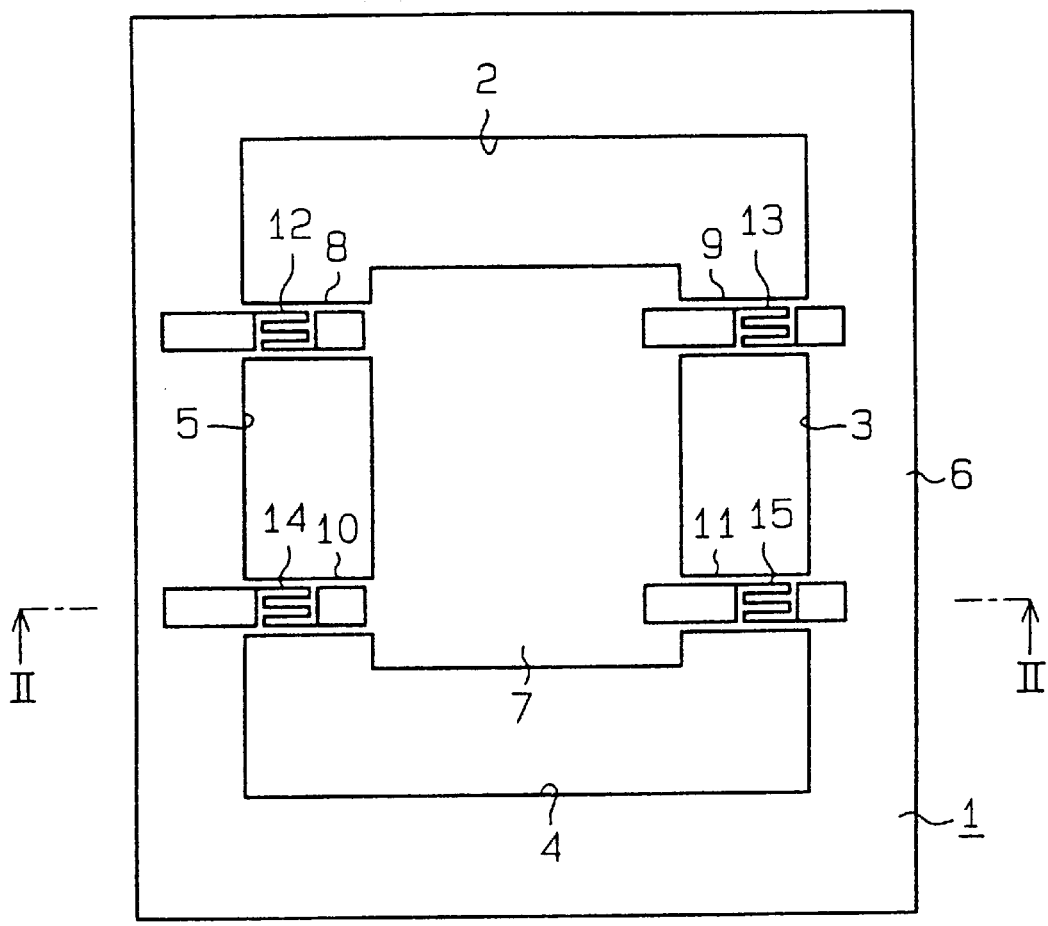
FIG. 1 is a plan view of a semiconductor acceleration sensor of a first embodiment of the present invention.
Figure 2:
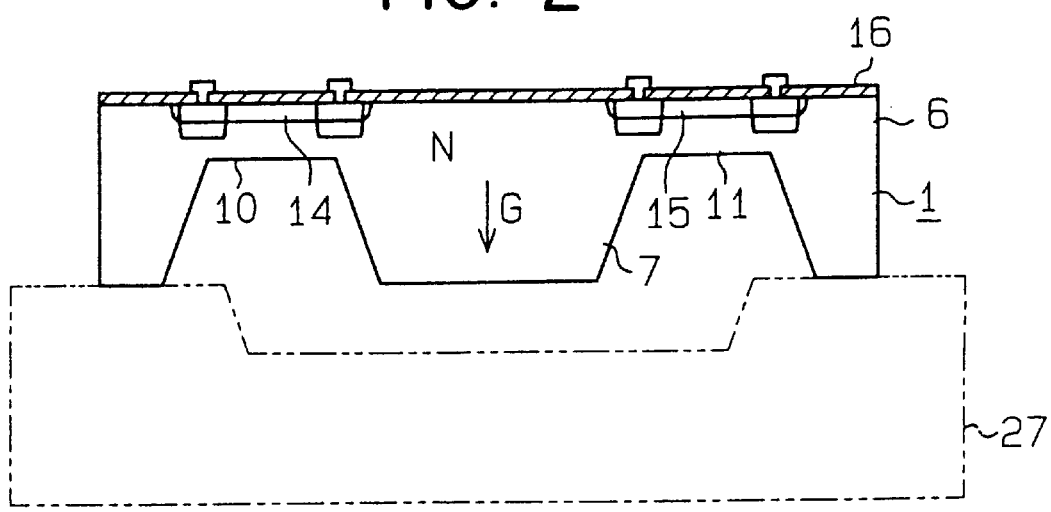
FIG. 2 is a II—II cross sectional view of the semiconductor acceleration sensor shown in FIG. 1.

In this embodiment, the present invention is embodied as a semiconductor acceleration sensor. As shown in FIGS. 1 and 2, an N-type single crystal silicon substrate (chip) 1 has through holes 2, 3, 4 and 5. Holes 2, 3, 4 and 5 define a square frame portion 6, a mass portion 7 and beam portions 8, 9, 10 and 11. The square frame portion 6 and the mass portion 7 are thick; the beam portions 8, 9, 10 and 11 are thin. The mass portion 7 is suspended inside the square frame portion 6 by the beam portions 8, 9, 10 and 11. The beam portions 8, 9, 10 and 11 are distorted when the mass portion 7 is accelerated. The N-type single crystal silicon substrate 1 is connected on a pedestal 27.

Figure 3A:
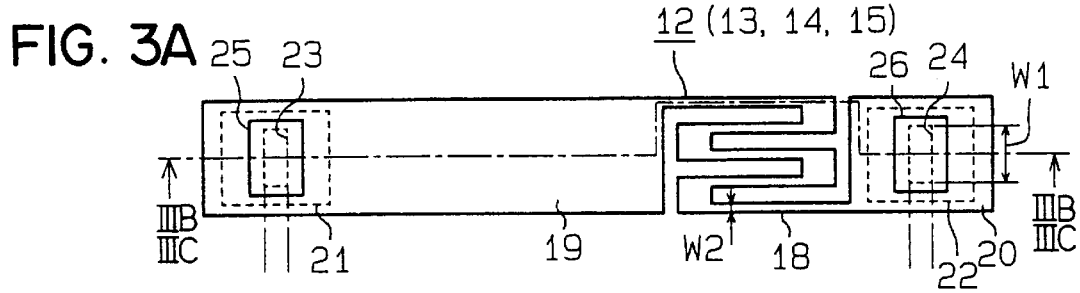
FIG. 3A is a detailed plan view of the area surrounding a gauge resistor.
Figure 3B:
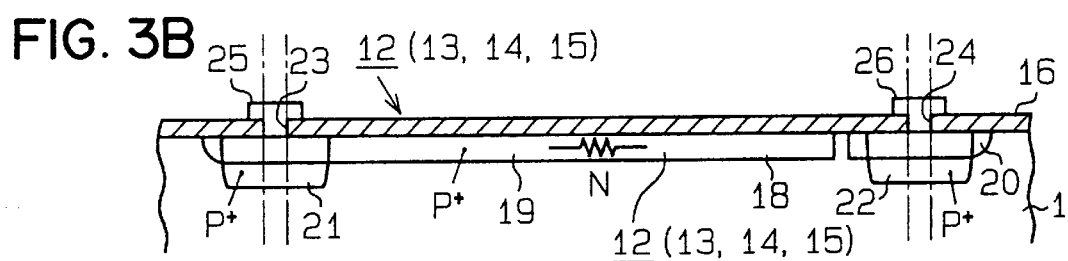
FIG. 3B is a detailed III—III cross sectional view of the gauge resistor shown in FIG. 3A before adjusting the offset voltage.

Gauge resistors 12, 13, 14 and 15 are formed on the beam portions 8, 9, 10 and 11. FIGS. 3A and 3B show the area around the gauge resistors 12, 13, 14 and 15. A silicon oxide layer 16 is formed on the N-type single crystal silicon substrate 1. Each of the gauge resistors 12, 13, 14 and 15 is made of a $P^+$-type impurity diffusion layer, formed at a surface of the N-type single crystal silicon substrate 1. Each of the gauge resistors ($P^+$-type impurity diffusion layers) 12, 13, 14 and 15 consists of a serpentine portion 18 and rectangular wide portions 19 and 20. The serpentine narrow portion 18 has one end connected with the wide portion 19 and another end connected with the wide portion 20.

A contact $P^+$-type impurity diffusion layer 21 is formed in the wide portion 19, and a contact $P^+$-type impurity diffusion layer 22 is formed in the wide portion 20. Contact holes 23 and 24 are formed into the silicon oxide layer 16. Aluminum electrodes 25 and 26 are formed on the silicon oxide layer 16, and are connected with the wide portions 19 and 20 and the contact $P^+$-type impurity diffusion layer 21 and 22 through the contact holes 23 and 24. An impurity concentration of each of the gauge resistors (an impurity concentration of the $P^+$-type impurity diffusion layers) 12, 13, 14 and 15 is $10^{19}/cm^3$ and a depth thereof is 1 $\mu$m. The impurity concentration of each of the contact $P^+$-type impurity diffusion layers 21 and 22 is $10^{20}/cm^3$ and the depth thereof is 3 $\mu$m. Because the contact $P^+$-type impurity diffusion layers 21 and 22 are deeper than the gauge resistors 12, 13, 14 and 15, the aluminum electrodes 25 and 26 do not short-circuit with the substrate 1 as a result of an alloy spike at a contact portion. The gauge resistors 12, 13, 14 and 15 between aluminum electrodes 25 and 26 operate as piezoelectric elements. Resistances of the gauge resistors 12, 13, 14 and 15 change in response to distortion of the beam portions 8, 9, 10 and 11. That is, the resistances of the gauge resistors 12, 13, 14 and 15 change in response to acceleration G acting on the mass portion 7.

Figure 4:
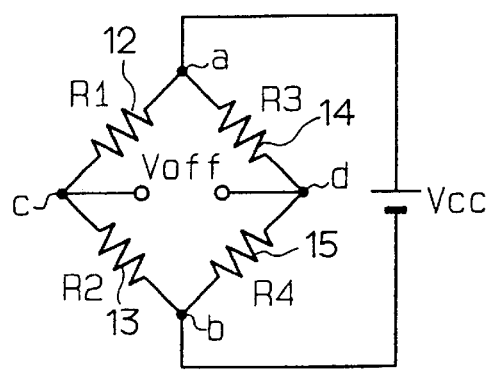
FIG. 4 is a circuit diagram of a bridge circuit.

As shown in FIG. 4, a whetstone bridge is formed by the gauge resistors 12, 13, 14 and 15. A voltage Vcc is applied between a connection point a between the gauge resistor 12 whose resistance is R1 and the gauge resistor 14 whose resistance is R3 and a connection point b between the gauge resistor 13 whose resistance is R2 and the gauge resistor 15 whose resistance is R4. Terminals between a connection point c between the gauge resistor 12 and the gauge resistor 13 and a connection point d between the gauge resistor 14 and the gauge resistor 15 correspond to an output of the bridge circuit (output of the potential difference between mid-points). The output voltage when no the acceleration is acting on the mass portion 7 corresponds to an offset voltage Voff.

The offset voltage Voff is determined by the resistances R1, R2, R3 and R4 of the gauge resistors 12–15. When the gauge resistances R1, R2, R3 and R4 are the same, the offset voltage Voff is zero. The offset voltage Voff is calculated as follows.

$$Voff=((R2/R1+R2)-(R4/R3+R4))\times Vcc \quad (1)$$

Figure 5:
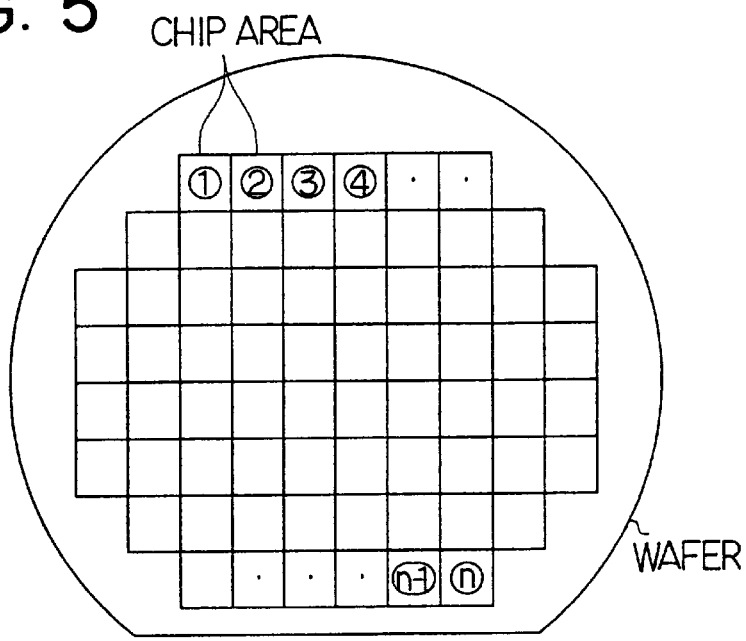
FIG. 5 is a plan view of a semiconductor wafer having a plurality of semiconductor chip areas.

According to Equation (1), when the gauge resistances R1, R2, R3 and R4 are not uniform, the offset voltage Voff is not zero. In general, the error range of the resistors formed in the semiconductor fabrication process is a few percent. For instance, if R1=R3=R4=8.5 k$\Omega$, R2=8.5 k$\Omega \times 101\%$=8.585 k$\Omega$, and Vcc=3V, the offset voltage Voff is calculated as 7.5 mv according to Equation (1). Typically, the offset voltage Voff should be less than $\pm 5$ mV. However, it is difficult to make the offset voltage Voff of all sensors within the above range. Therefore, when chip areas (1, 2, - - - ,n−1, n) are formed on the semiconductor wafer shown in FIG. 5, some chips whose offset voltages Voff are outside of the range $\pm 5$ mV should be removed.

Figure 6:
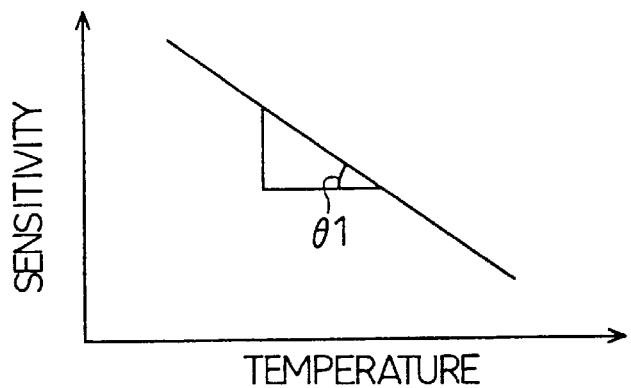
FIG. 6 is a graph of the relationship between temperature and sensitivity of the sensor.
Figure 7:
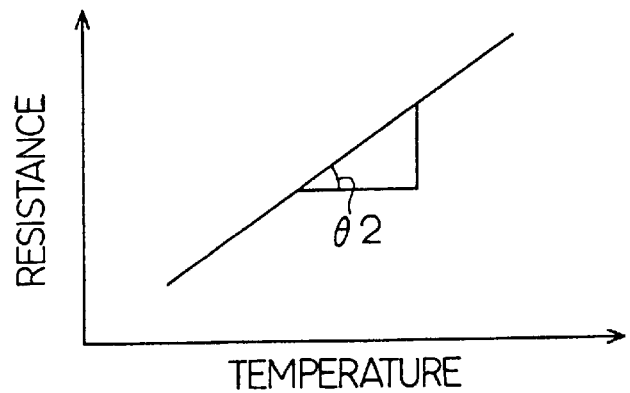
FIG. 7 is a graph of the relationship between temperature and resistance of the sensor.
Figure 8:
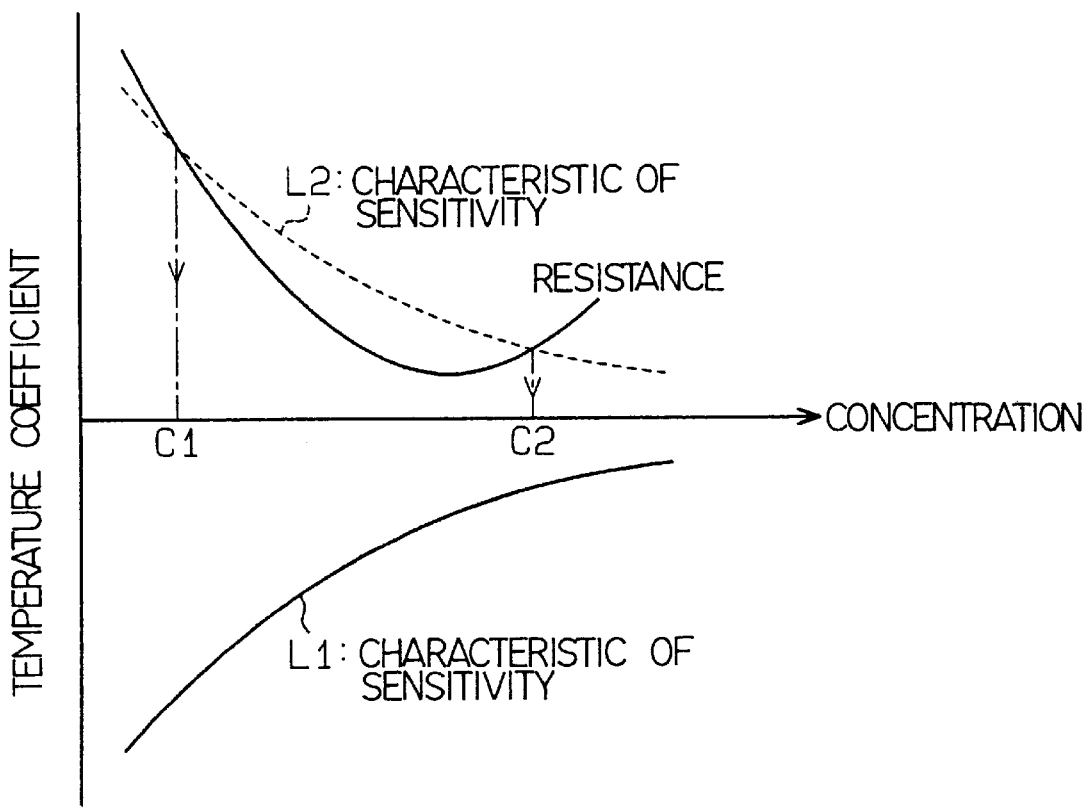
FIG. 8 is a graph of the relationship between concentration, temperature and resistance of the sensor.

With dynamic sensors such as the acceleration sensor, it is useful that an absolute value of a temperature coefficient of sensitivity $\theta 1$ (shown in FIG. 6) is the same as an absolute value of a temperature coefficient of resistance $\theta 2$ (shown in FIG. 7) in order to compensate for the temperature characteristic of the sensors. Therefore, as shown in FIG. 8, an impurity concentration of each gauge resistor is set at a self sensitivity compensation area C1 or C2 on a sensitivity characteristic L2 whose sign is opposite to a sensitivity characteristic L1. In this case, because constant current (Icc) flows to the bridge circuit, Equation (1) is revised as follows:

$$Voff=((R2/R1+R2)-(R4/R3+R4))\times Rgauge \times Icc \quad (2)$$

Rgauge is the resistance of the bridge circuit, and calculated as follows:

$$Rgauge=((R1+R2)\times(R3+R4))/(R1+R2+R3+R4)$$

Thus, $$Voff=((R2/R1+R2)-(R4/R3+R4))\times((R1+R2)\times(R3+R4))/(R1+R2+R3+R4)\times Icc \quad (3)$$

With Equation (3), the partial derivative of Voff with respect to temperature T is as follows.

$$\partial Voff/\partial T=-1/(R1+R2+R3+R4)\times \partial R/\partial T\times(4\times Voff+Icc\times(R1-R2-R3+R4)) \quad (4)$$

In Equation (4), $\partial R/\partial T=\partial R1/\partial T=\partial R2/\partial T=\partial R3/\partial T=\partial R4/\partial T$. According to Equation (4), when R1=R2=R3=R4, Voff=0 and $\partial Voff/\partial T=0$.

According to these Equations, the output from the bridge circuit depends on temperature in direct proportion to the offset voltage Voff. Therefore, when the offset voltage Voff is zero, the output from the bridge circuit, when an acceleration is not acting on the sensor, does not depend on temperature. Therefore, it is necessary to decrease the offset voltage Voff so that the characteristic of the sensor improves.

The inventors of the present invention discovered that the reproduceability of the offset voltage Voff at each chip area located at the same position over a series of the semiconductor wafers is good. Thus, the gauge resistances R1, R2, R3 and R4 for chips should have good reproduceability.

Contact portions 23 and 24 for gauge resistors 12, 13, 14 and 15 are formed by removing silicon oxide layer 16 in areas defined by a contact mask which is a photomask. The resistances R1, R2, R3 and R4 of gauge resistors 12, 13, 14 and 15, respectively, are adjusted by using an adjusted contact mask. Wafers made by the adjusted contact mask have adjusted contact portions (where the aluminum electrodes 25 and 26 contact the gauge resistors 12, 13, 14 and 15) as compared to wafers made before the contact mask was adjusted. As a result, resistances R1, R2, R3 and R4 are adjusted.

In this embodiment, the portion of the contact mask for each chip on the wafer is adjusted the same way as the corresponding portions of the contact mask for all of the other chips on the wafer. The portion of the contact mask for each chip is adjusted to adjust the contact portions of selected ones of gauge resistors 12, 13, 14 and 15 for each chip so that the modal offset voltage Voff becomes zero. As a result, the selected contact portions and, therefore, the selected resistances of the gauge resistors, for all chips on the wafer are adjusted the same amount.

In this embodiment, first, the gauge resistors 12, 13, 14 and 15 are formed on the chip areas before dicing the semiconductor wafer, and at least either the resistances R1, R2, R3 and R4 or the output of the bridge circuit is measured. As shown in a solid line of FIG. 9, when most of the offset voltages Voff of the chips on the semiconductor wafer are within a standard range, but the modal offset voltage Voff deviates from zero (difference $\Delta V$), the portion of the contact mask for each chip is adjusted the same amount, so that the contact portions of the gauge resistors 12, 13, 14 and 15 made with the adjusted contact mask are adjusted the same for all chips on the wafer, as compared to wafers made with the contact mask prior to adjustment. As a result, the offset voltage Voff of the bridge circuit formed on each chip area is adjusted the same amount, and the modal offset voltage Voff for all chips on the wafer approaches zero as shown in a dashed line of FIG. 9.

Figure 3C:
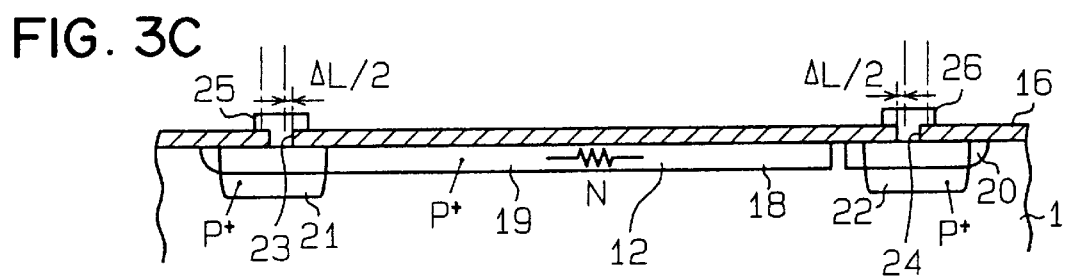
FIG. 3C is a detailed III—III cross sectional view of the gauge resistor shown in FIG. 3A after adjusting the offset voltage.
Figure 22:
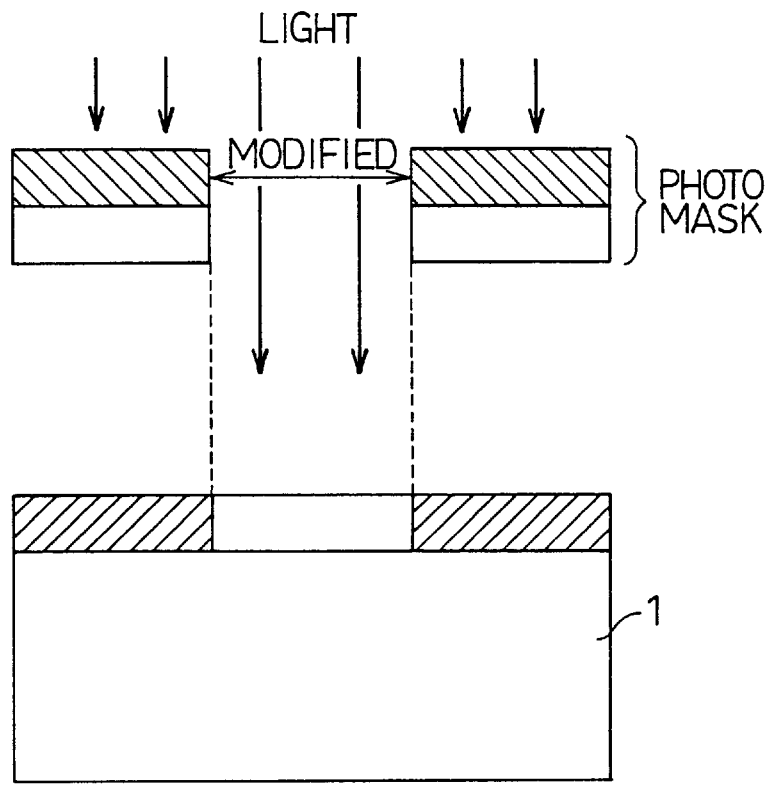
FIG. 22 is a cross sectional view of a photo mask and a wafer.

FIG. 3C shows one example of a gauge resistor where the contact portions are adjusted compared to the contact portions of the gauge resistor of FIG. 3B (that is, the gauge resistor of FIG. 3B was made with a contact mask prior to adjustment and the gauge resistor of FIG. 3C was made with the contact mask after adjustment). In FIG. 3C, the resistance of gauge resistor 12 is adjusted from 8.55 k$\Omega$ to 8.50 k$\Omega$. That is, FIG. 3C shows that the resistance of gauge resistor 12 decreases 0.05 k$\Omega$ (=$\Delta R$). With this fabrication process, the gauge resistors 12, 13, 14 and 15 and the contact P$^+$-type impurity diffusion layers 21 and 22 are formed on the N-type single crystal silicon substrate 1 before dicing. The silicon oxide layer 16 on the N-type single crystal silicon substrate 1 is etched to form the contact holes 23 and 24. The aluminum electrodes 25 and 26 are formed onto the contact holes 23 and 24. In this situation, if one of the gauge resistances R1, R2, R3 and R4 is 8.5 k$\Omega$+$\Delta R$, that is, if one of the gauge resistances R1, R2, R3 and R4 is $\Delta R$ larger than the others (8.5 k$\Omega$), the contact portions for that resistor in future wafers are adjusted by means of modifying the portions of the contact mask corresponding to those contact portions. As shown in FIG. 22, when the modified contact mask is placed above the wafer and illuminated, the contact portions for that resistor are adjusted. As a result, the contact hole 23 shown in the left side of the FIG. 3B is shifted by $\Delta L/2$ toward the right side, as shown in FIG. 3C. Also, the contact hole 24 shown in the right side of the FIG. 3B is shifted by $\Delta L/2$ toward the left side, as shown in FIG. 3C. Note that the contact holes 23 and 24 in FIG. 3C are the same size and shape as contact holes 23 and 24 in FIG. 3B, but merely shifted in position. As the distance between the contact holes 23 and 24 becomes $\Delta L$ narrower, the resistance becomes 8.5 k$\Omega$. In detail, the amount of adjustment $\Delta L$ is calculated as follows.

$$\Delta L = \Delta R \times w1/\rho s \quad (5)$$

In Equation (5), w1 is the width of the contact holes 23 and 24 (see in FIG. 3A), $\rho s$ is sheet resistance of the gauge resistors (P$^+$-type impurity diffusion layer) 12, 13, 14 and 15.

As described above, this embodiment has the following features. First, the gauge resistors 12, 13, 14 and 15 are formed on each chip area of the silicon substrate 1 while in a wafer (before dicing). At least either the resistance of the gauge resistor or the output of the bridge circuit is measured. The offset voltage of the bridge circuit formed on each chip area is adjusted for future wafers by adjusting the contact position of at least one of the gauge resistors 12, 13, 14 and 15 of each chip before dicing the silicon substrate 1. As a result, because the reproduceability of the offset voltage Voff on the chip area located at the same position of the semiconductor wafer is good, when the gauge resistance is adjusted for future wafers by adjusting the contact portion of the gauge resistor, the modal offset voltage of future wafers approaches zero.

Figure 9:
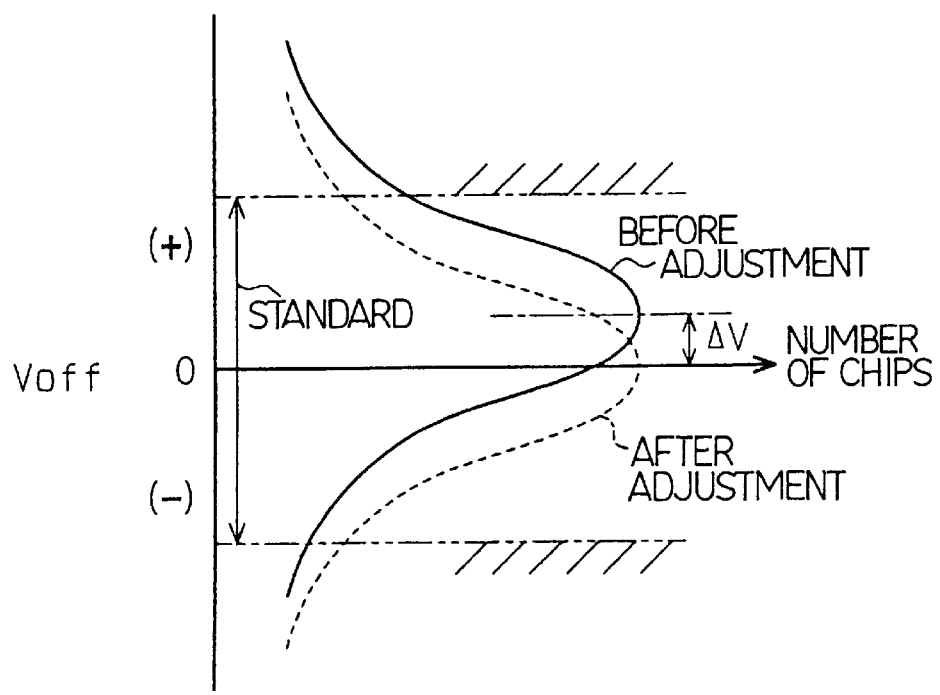
FIG. 9 is a distribution graph of the offset voltage.

Second, as shown in solid line of FIG. 9, when the offset voltages Voff most of the chips on the semiconductor wafer fall within a standard range and the modal voltage Voff of the chips on the semiconductor wafer deviates from zero (difference $\Delta v$), selected contact portions of the gauge resistors 12, 13, 14 and 15 for all of the chips on the wafer are adjusted the same amount in the offset voltage adjustment process. As a result, the offset voltage of each chip on future wafers can be evenly shifted.

Figure 10A:
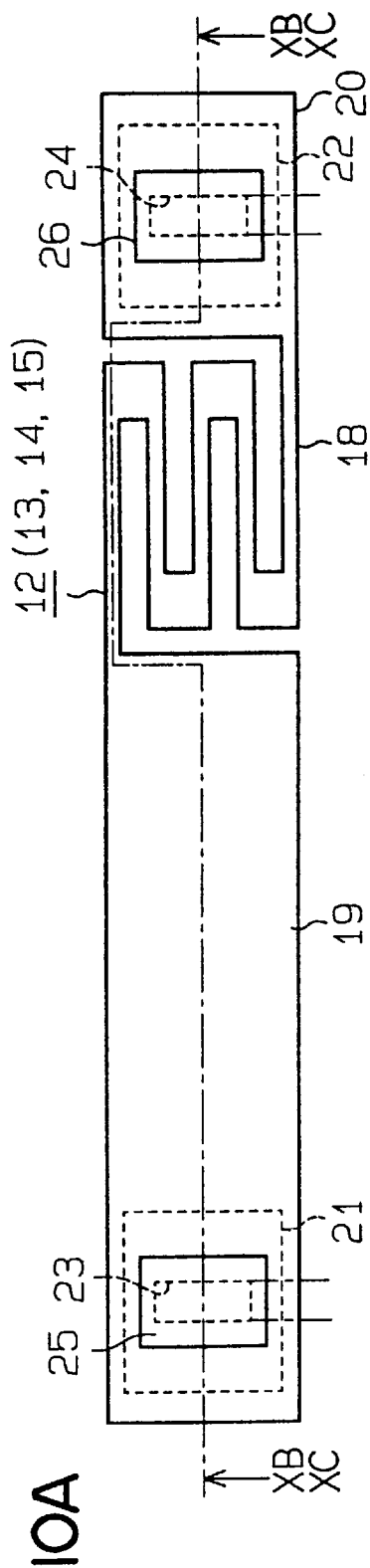
FIG. 10A is a detailed plan view of a modification of the area surrounding the gauge resistor.
Figure 10B:
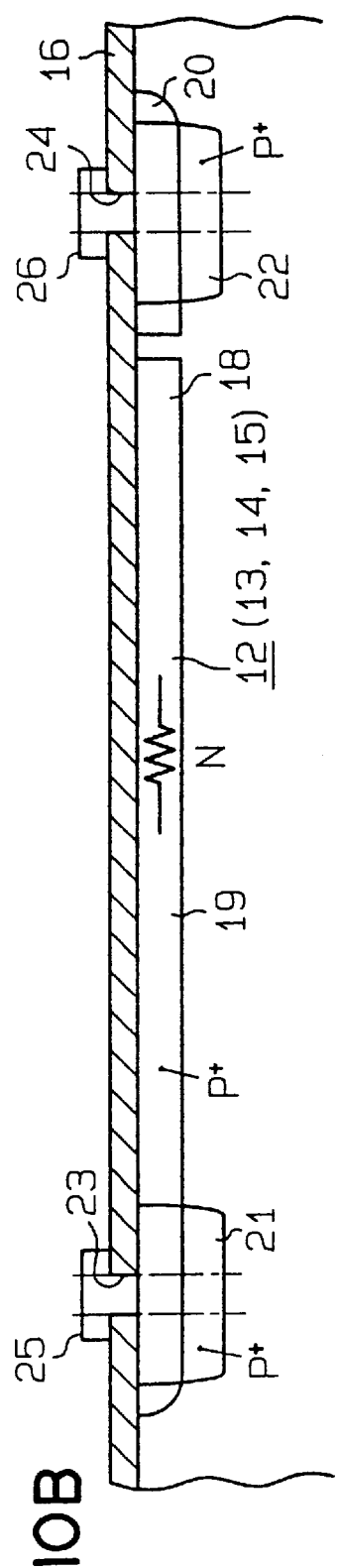
FIG. 10B is a detailed X—X cross sectional view shown in FIG. 10A before adjusting the offset voltage.
Figure 10C:
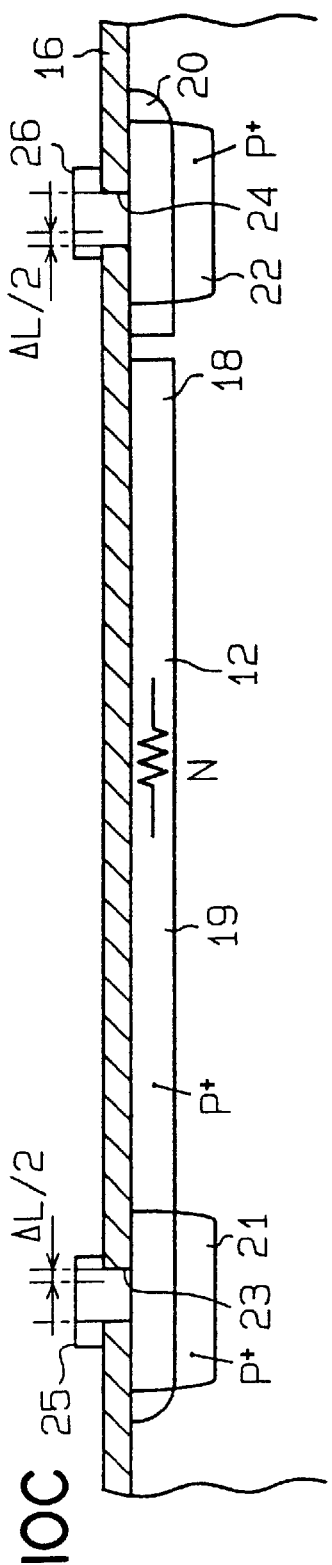
FIG. 10C is a detailed X—X cross sectional view shown in FIG. 10A after adjusting the offset voltage.

Instead of shifting the contact position of the contact portions, while maintaining the size or shape of the contact portions, as illustrated in FIG. 3C, it is also possible to adjust the size and/or shape of the contact portions on each chip area for future wafer as shown in FIGS. 10B and 10C. As a result, the gauge resistance is adjusted. As another method for adjusting the gauge resistances, plural contact holes 30a, 30b, 30c, 31a, 31b and 31c can be formed. Then, positions of the aluminum electrodes 25 and 26 are shifted in order to select a suitable gauge resistance.

(Second Embodiment)

Figure 12:
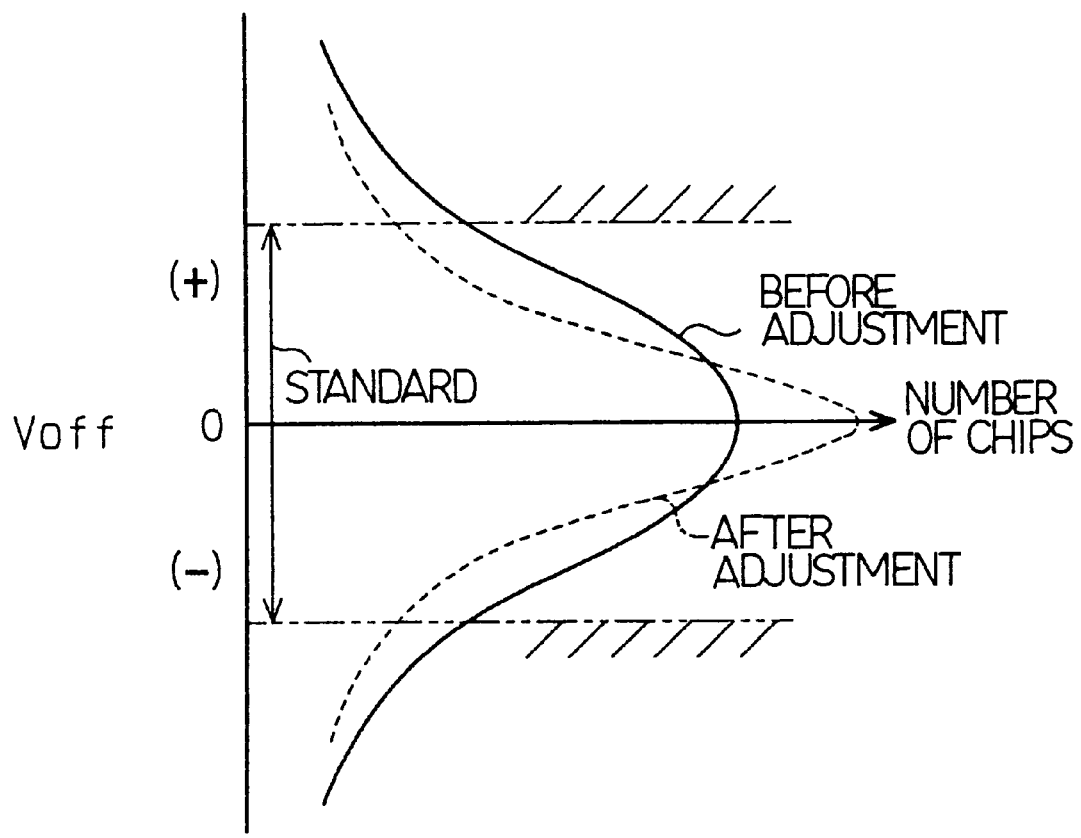
FIG. 12 is a distribution graph of the offset voltage.

A second embodiment of the present invention is described, focusing on the differences between the second embodiment and the first embodiment. The first embodiment is useful in a situation in which, as shown in the solid line of FIG. 9, the offset voltage Voff of most chips on the semiconductor wafer fall within a standard range, but the modal offset voltage Voff on the semiconductor wafer deviates from zero (difference $\Delta V$). However, as shown in the solid line of FIG. 12, when the offset voltages Voff of chips on the semiconductor wafer are more varied, the second embodiment is useful.

First, the gauge resistors 12, 13, 14 and 15 are formed on each chip area of the silicon substrate while in a wafer. At least either the resistances R1, R2, R3 and R4 of the gauge resistors or the output of the bridge circuit is measured. The adjustments of the gauge resistances R1, R2, R3 and R4 are calculated based on at least the gauge resistances R1, R2, R3 and R4 or outputs of the bridge circuits, then the contact mask is adjusted, so that future wafers made with the adjusted contact mask have adjusted contact positions. The contact positions are adjusted by using the contact mask as described with regard to FIGS. 3A–3C, 10A–10C or 11A–11C.

As described above, at least either the gauge resistances or the offset voltages of the bridge circuit of all chips on the wafer are measured and the portion of the contact mask for adjusting the contact positions or the size and/or shape of the contact holes of each chip is individually modified based on the gauge resistances or the offset, chip-by-chip. As a result, the offset voltage Voff of each chip approaches zero and the variations of the offset voltages Voff among the chips decrease.

Figure 13:
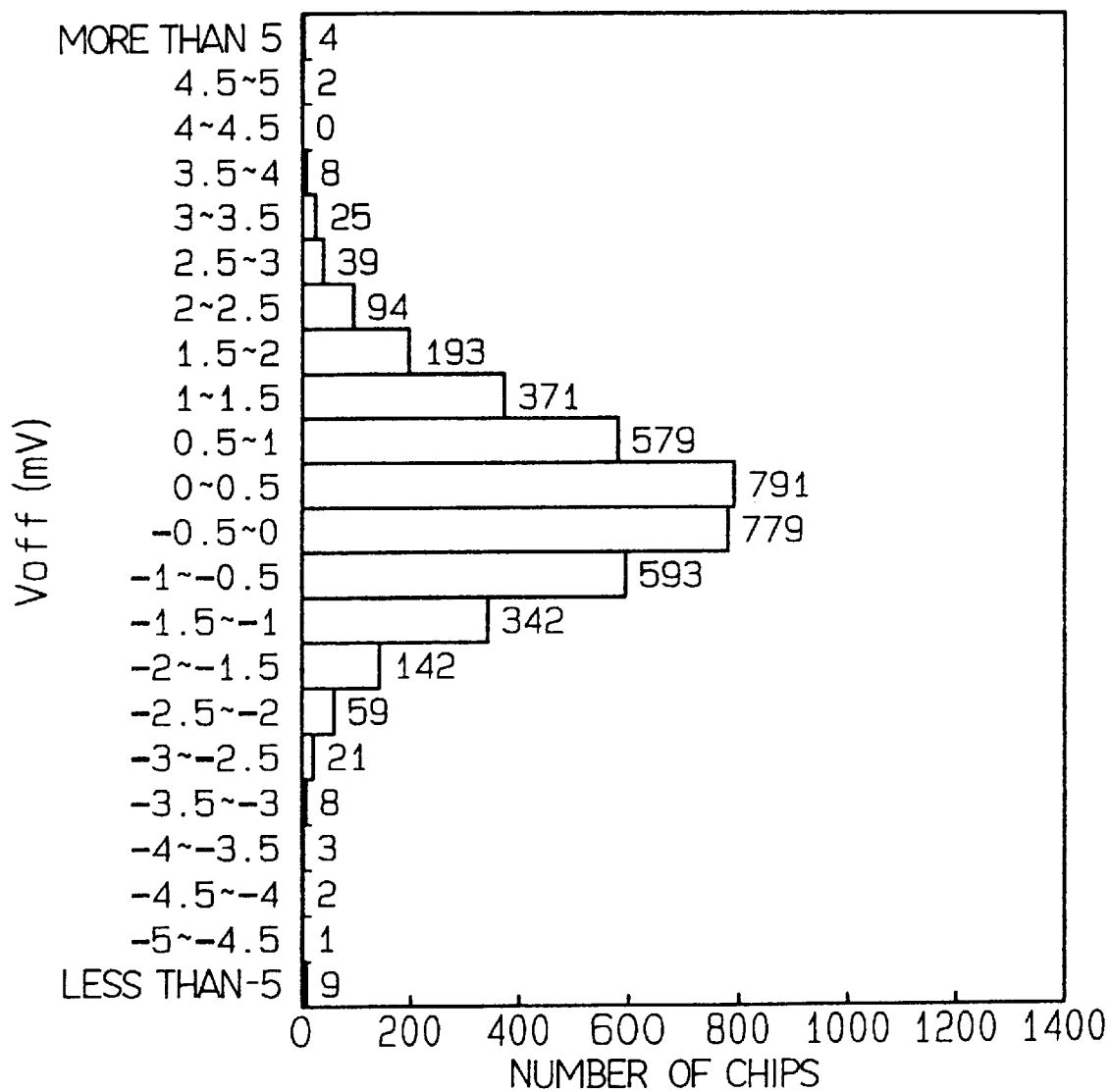
FIG. 13 is a histogram of the offset voltage prior to adjusting the gauge resistor.
Figure 14:
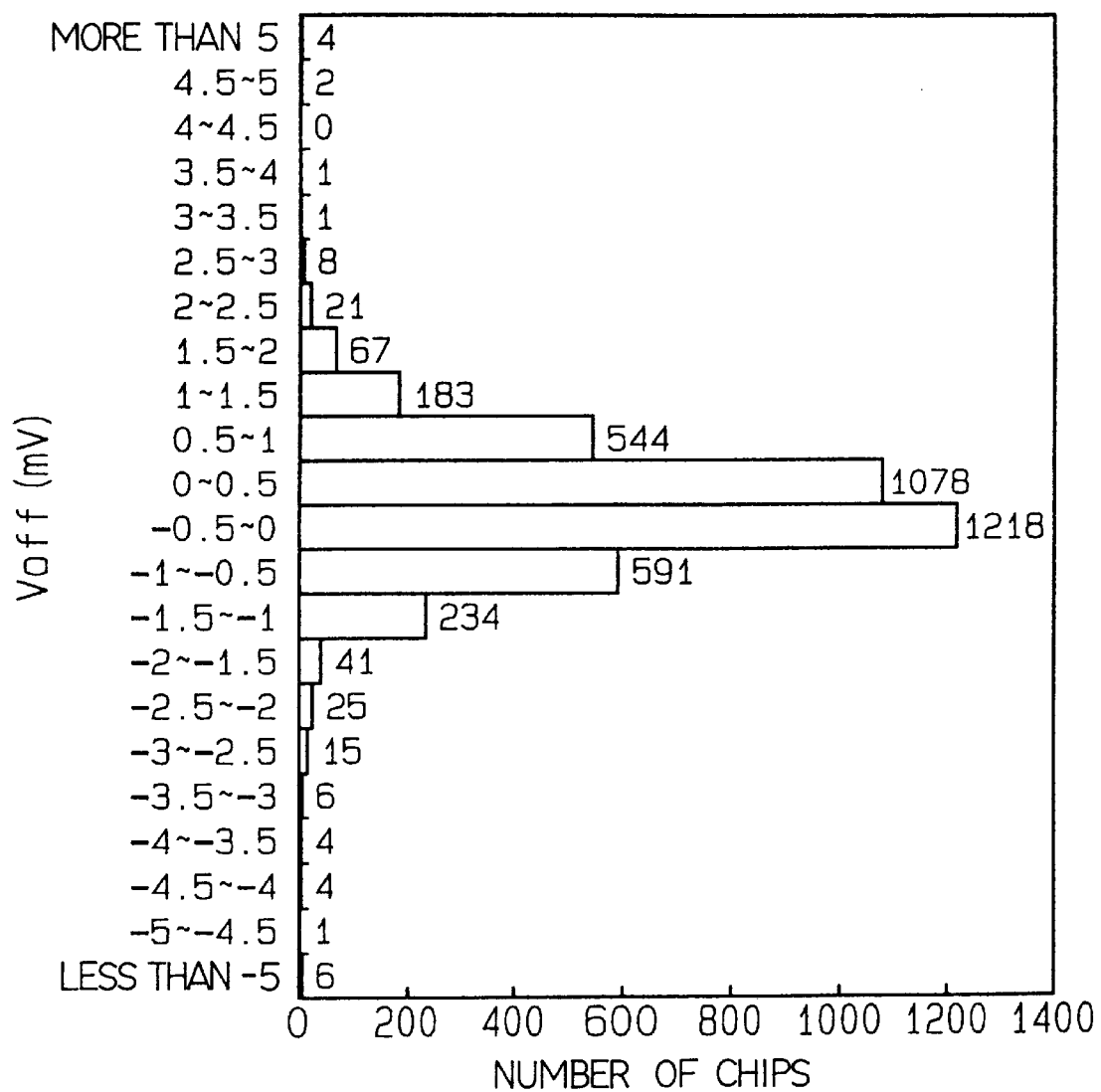
FIG. 14 is a histogram of the offset voltage after adjusting the gauge resistor.
Figure 15:
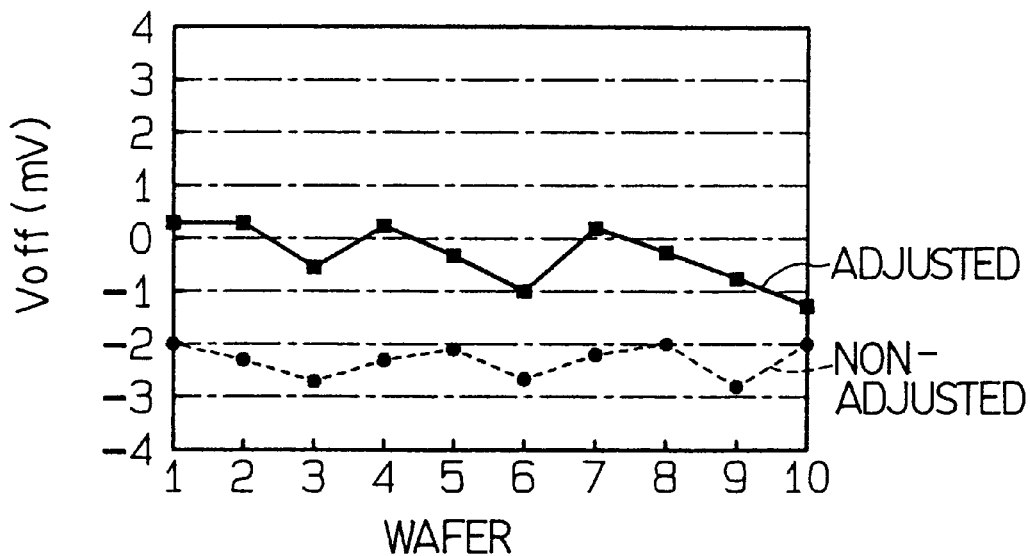
FIG. 15 is a graph of offset voltages for various wafers.
Figure 16:
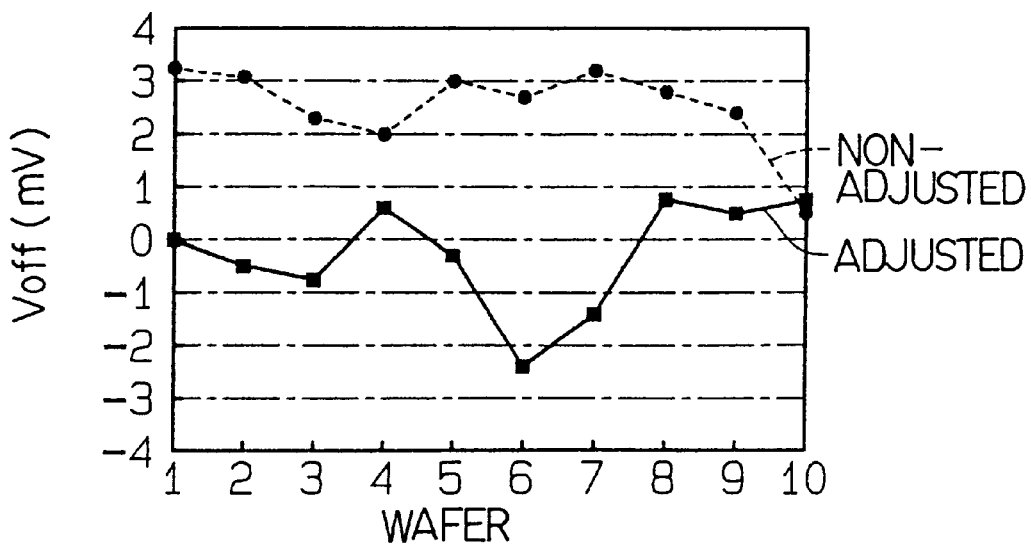
FIG. 16 is a graph of offset voltages for various wafers.
Figure 17:
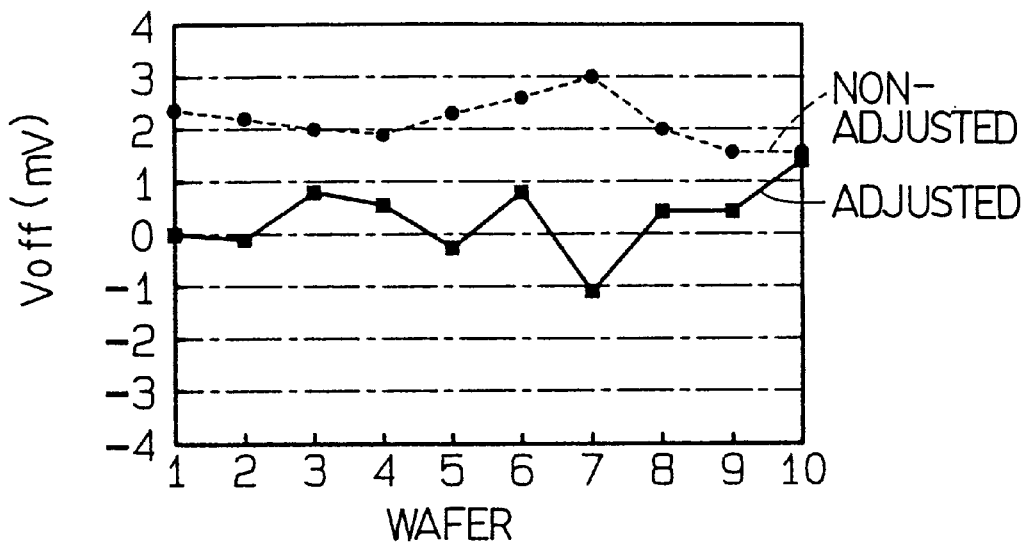
FIG. 17 is a graph of offset voltages for various wafers.
Figure 18:
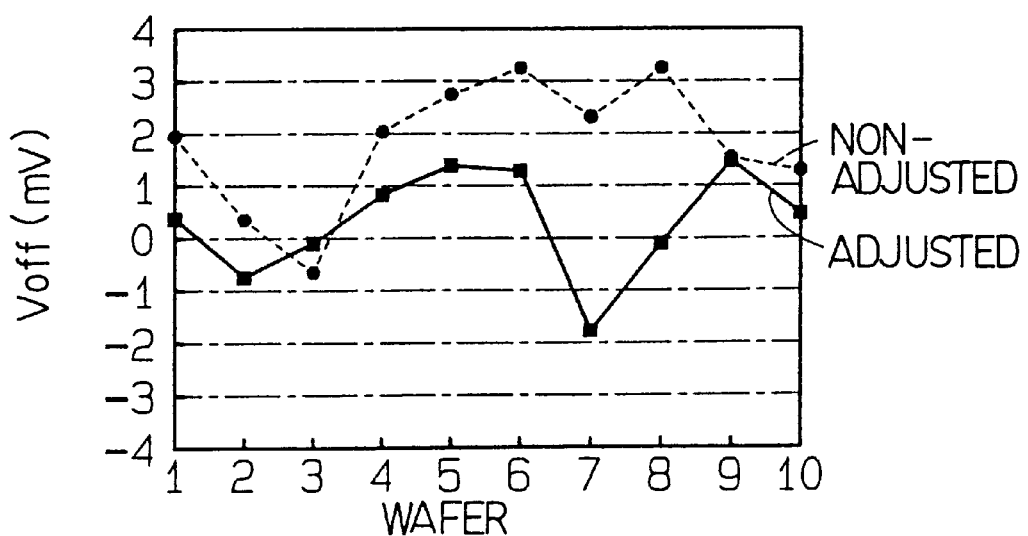
FIG. 18 is a graph of offset voltages for various wafers.
Figure 19:
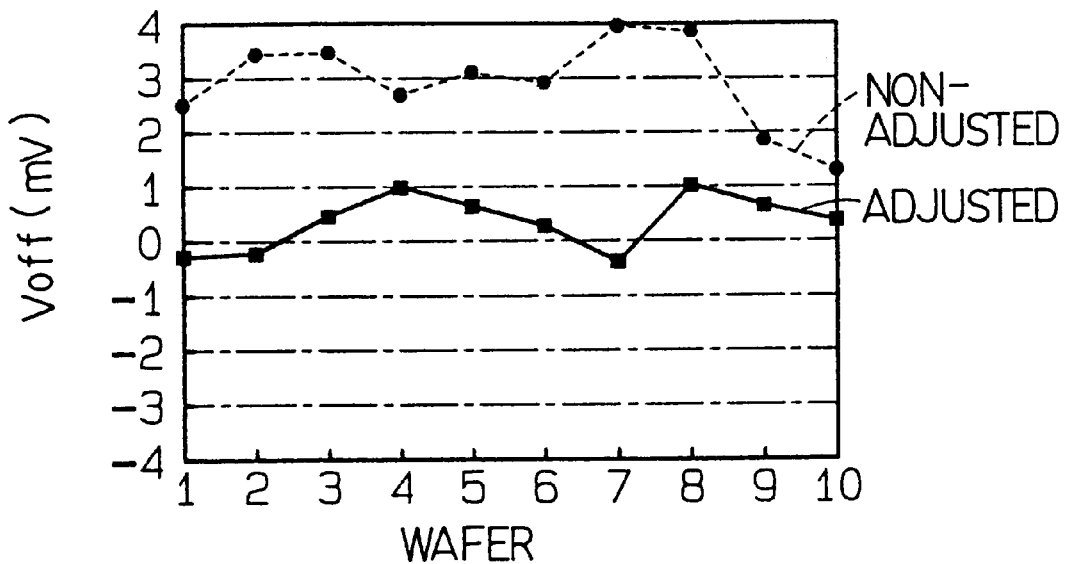
FIG. 19 is a graph of offset voltages for various wafers.
Figure 20:
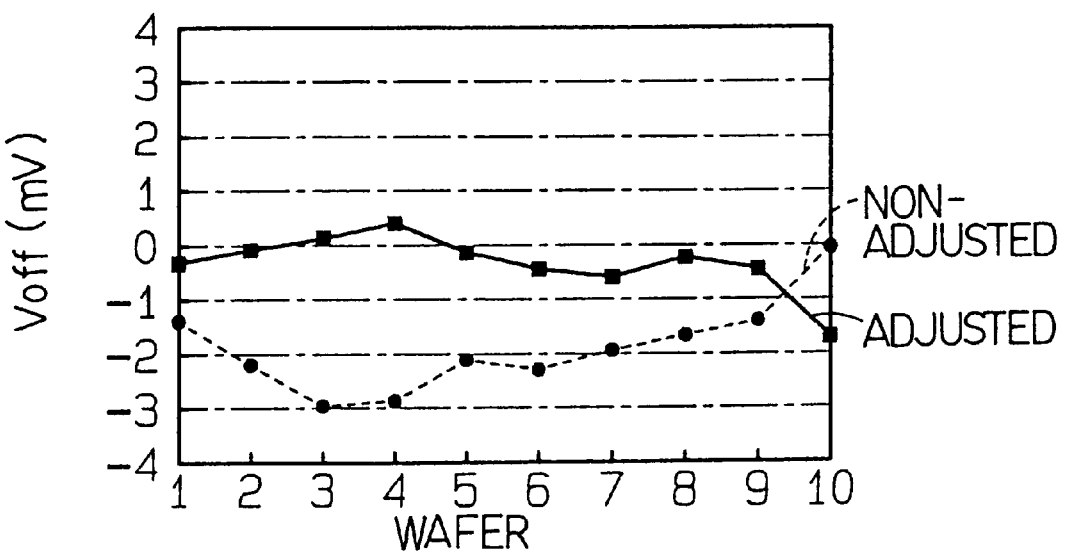
FIG. 20 is a graph of offset voltages for various wafers.

FIGS. 13 and 14 are histograms of the offset voltage Voff concerning chip areas formed on 10 wafers. Also, FIGS. 13 and 14 show the effect of adjusting the contact portion. FIG.

13 shows the dispersion of the offset voltage Voff where the non-adjusted contact mask is used for forming the contact position. FIG. 14 shows the dispersion of the offset voltage Voff where the adjusted contact mask is used for forming the contact position based on the result of FIG. 13. As shown in FIG. 13 and 14, the offset voltages Voff shown in FIG. 14 are gathered around zero as compared with FIG. 13.

FIGS. 15 through 20 show samples of the offset voltages Voff on the same chip locations 76, 84, 128, 148, 150 and 165, respectively, over 10 wafers. The dashed line of each figure shows the offset voltage where the contact position is not adjusted, and the solid line of each figure shows the offset voltage where the contact position is adjusted. As shown in FIGS. 15 through 20, the median of the offset voltage Voff shown by the solid line is around 0 mV as compared with the offset voltage Voff shown by the dashed line. In FIGS. 15–20, the number of chips n shown in FIG. 5 (the number of chips formed on a single wafer) is 407.

When the contact position is shifted, the gauge resistance (resistance of $P^+$-type impurity diffusion layers 12, 13, 14, 15, 21 and 22) changes. As a result, the offset voltage Voff approaches zero.

In the second embodiment, the contact portion of each chip is individually adjusted as compared to previously made wafers so that the variation in the offset voltages Voff decreases among chips on the wafer. The inventors of the present invention investigated whether or not the variation of the offset voltage Voff could be decreased by adjusting the width W2 of the guage resistor. FIGS. 15–20 show the characteristics of different chips formed over a series of ten wafers. These Figures illustrate that the characteristics are different for different chips on the same wafer even though each chip is formed by the same mask at the same time. Thus, some offset voltages Voff deviate from zero to the plus side, while other offset voltages Voff deviate from zero to the minus side.

Suppose we try to decrease the dispersion of the offset voltages Voff by adjusting the width of the gauge W2. Suppose the width of the gauge W2 is 3 $\mu$m, the length of the gauge L is 1275 $\mu$m, and the gauge sheet resistance $\rho s$ is 200 $\Omega/\square$. Also, suppose that the width of gauge resistance R2 is different from the width of the others gauge resistances R1, R3 and R4. As a resuLt, the offset voltage Voff is 5 mV when a driving voltage Vcc is 3V. The resistances R1, R3 and R4 are precisely designed. In this situation, $$R=\rho s \times L/W2$$

Thus, R1=R3=R4=8.5 k$\Omega$. Further, according to equation (1), R2=8.557 k$\Omega$, and the width of the resistance R2 is 2.98 $\mu$m. Since the difference between the width of the resistance R2 and that of the resistances R1, R3 and R4 is 0.02 $\mu$m, it is impossible to detect this difference (=0.02 $\mu$m) because 0.02 $\mu$m may be regarded as an error. Therefore, it is impossible to decrease the dispersion of the offset voltage Voff by adjusting the width of the gauge W2.

In contrast, in the second embodiment where the offset voltage is adjusted chip by chip, in order to adjust the resistance R2 to 8.5 k$\Omega$, when $\Delta R$ is $-57$ $\Omega Q$, the gauge sheet resistance $\rho s$ is 10 $\Omega/\square$, and contact width W is 30 $\mu$m for example, the amount of adjustment of position $\Delta L$ is calculated at $-17$ $\mu$m according to equation (1).

As described above, the second embodiment has the following features. As shown in solid line of FIG. 12, when the offset voltages Voff among the chips on a wafer vary excessively, the contact portion for the gauge resistor formed on each chip of future wafers is individually adjusted during the offset voltage adjustment process. As a result, as shown in dashed line of FIG. 12, the variation of the offset voltage decreases.

(Third Embodiment)

Figure 23:
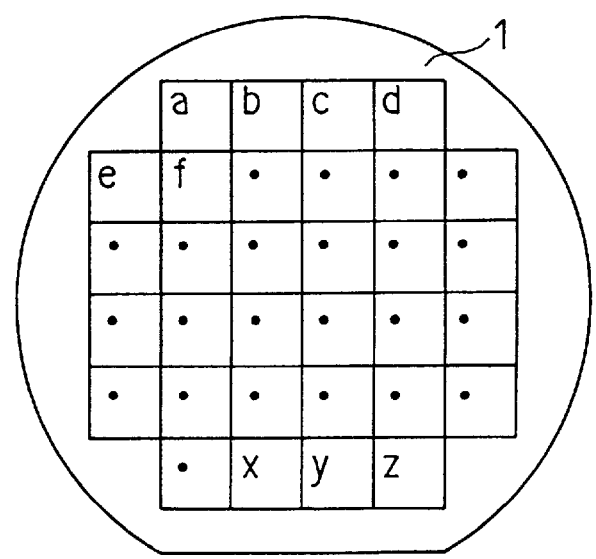
FIG. 23 is a plan view of the semiconductor chips having a sign indicating the amount of an expected offset voltage or an adjustment of the offset voltage.

As shown in FIG. 23, a plurality of the chip areas are formed on the silicon substrate 1 (wafer) in a predetermined pattern. Indications of the amount of the offset voltage or the adjustment of the offset voltage a-z, in the form of alpha-numeric characters, are formed on each chip area. After forming the indications, the wafers is diced into a plurality of semiconductor chips. According to this process, it is easy to know the expected offset voltage Voff or the amount by which the offset voltage Voff was adjusted even after the wafer is diced.

Figure 24:
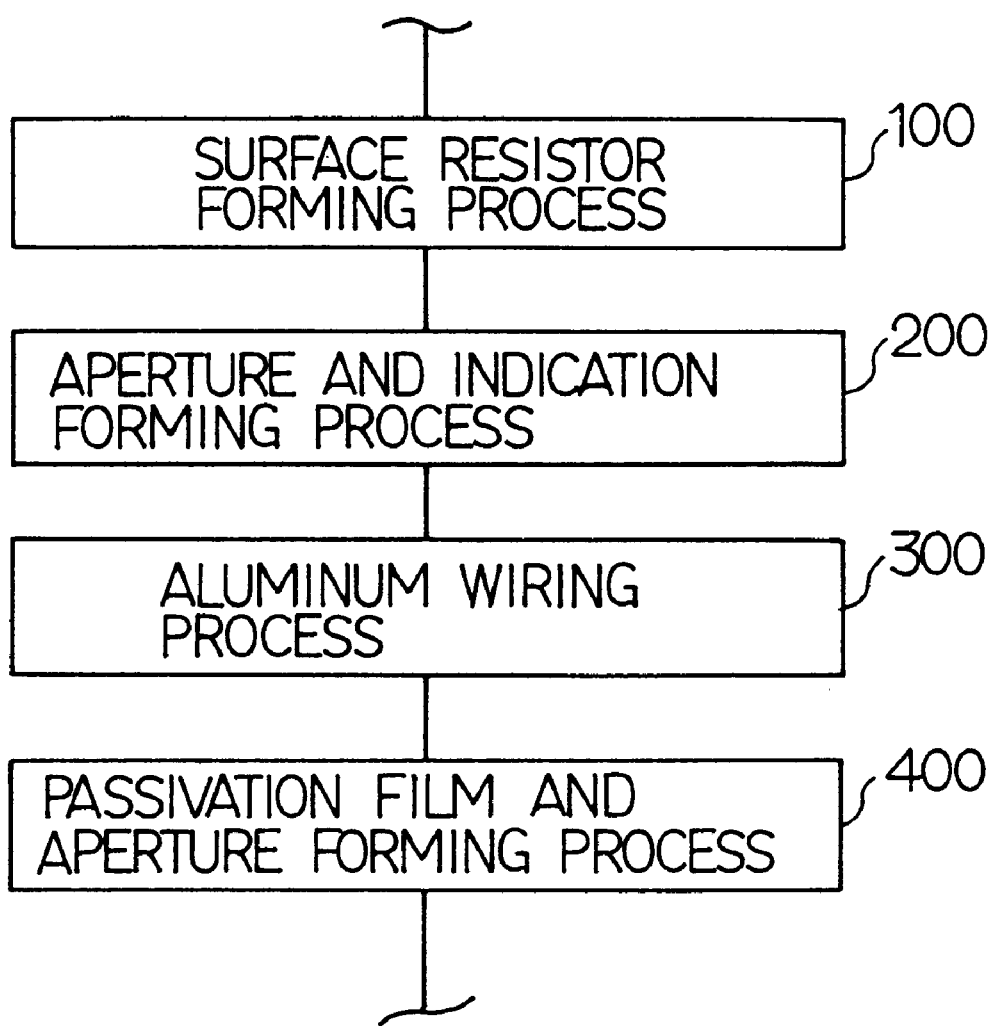
FIG. 24 is a flowchart showing a fabrication process of the semiconductor acceleration sensor.

According to this embodiment, a prototype wafer is made, the offset voltage Voff or the gauge resistances are measured for each chip and a determination is made as to how the contact portions are to be modified for future wafers as described in either of the first and second embodiments above. A process for forming the indications a-z for of the expected offset voltage Voff or the amount of the adjustment of the offset voltage Voff on the chips is described with FIG. 24. FIG. 24 shows a fabrication process of semiconductor acceleration sensor. First, a silicon oxide film is formed on the surface of the silicon substrate and also diffusion resistors are formed on the silicon substrate by ion implantation or deposition (Step 100). Second, apertures, such as contact holes, are selectivity formed into the silicon oxide film by a photolithography. Also, indications of the expected offset voltage Voff or the amount of adjustment of the offset voltage Voff on each chip, formed of alpha-numeric characters for example, are formed in a photo mask in areas corresponding to predetermined areas of the chips (Step 200). The size of the pattern formed on the photo mask is the same as that of the wafer, and a direct exposure is adopted. It is possible to adopt a reduced exposure technique instead of the direct exposure technique. However, in this case, a plurality of masks are needed. The mask is then used to pattern the silicon oxide film with indications a-z.

Next, an aluminum film is deposited on the silicon substrate, then, aluminum wires are formed by a photolithography from the aluminum film (Step 300). The passivation film (silicon nitride film) is formed on the silicon substrate. Then, apertures are formed into the passivation film by photolithography (Step 400).

It is possible to form the indications by other methods instead of patterning the silicon oxide layer. For instance, patterning the silicon substrate, patterning an aluminum layer or patterning a passivation layer is useful.

According to the third embodiment, it is possible to know the expected offset voltage Voff or the amount of the adjustment of the offset voltage Voff after dicing the wafer and also after packaging diced chips. Thus, it is possible to investigate the correlation between the offset voltage Voff and the packaged chips when the packaged chips are checked to determine whether or not the packaged chips are good.

Figure 21A:
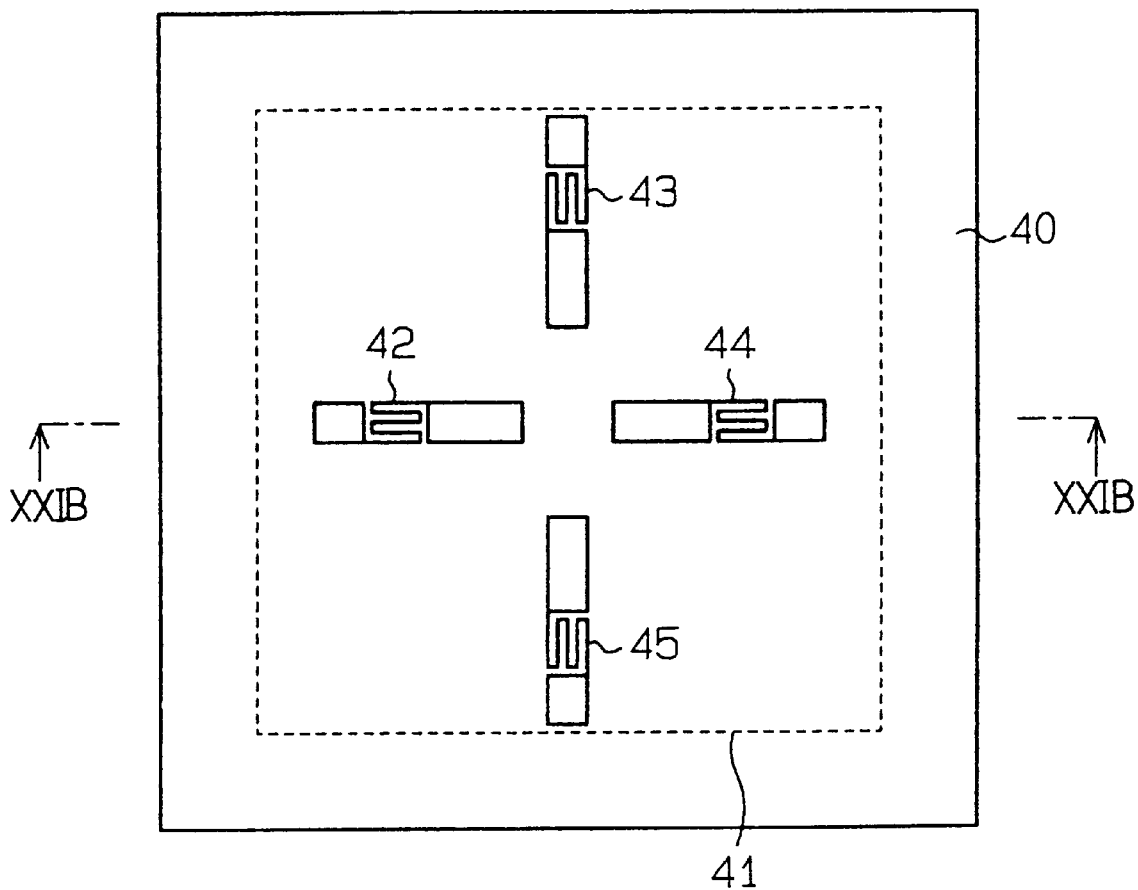
FIG. 21A is a top plan view of a semiconductor pressure sensor of a third embodiment of the present invention.
Figure 21B:
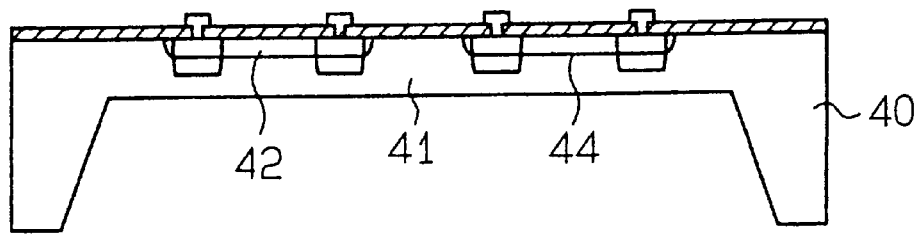
FIG. 21B is a detailed XXIB—XXIB cross sectional view of the pressure sensor of FIG. 21A.

The present invention may be embodied in other specific forms without departing from the spirit or essential characteristic thereof. For instance, a semiconductor pressure sensor can employ the present invention instead of the semiconductor acceleration sensor. In detail, as shown in FIGS. 21A and 21B, a diaphragm 41 is formed on the center portion of a single crystal silicon substrate 40, and the gauge resistors 42, 43, 44 and 45 are formed on the diaphragm 41.

A half bridge circuit can be used with the present invention instead of the full bridge circuit.

We claim:

1. A method for fabrication of a semiconductor sensor comprising:

forming a gauge resistor on each chip area of a semiconductor substrate having a plurality of chip areas forming an electrode on the gauge resistor with an insulating film interposed therebetween, the insulating film having a contact portion through which the gauge resistor electrically connects with the electrode;

measuring a resistance of the gauge resistor; and adjusting the contact portion of the gauge resistor based on the resistance of the gauge resistor.

2. The method for fabrication of a semiconductor sensor according to claim 1, wherein the adjusting of the contact portion shifts a position of the contact portion.

3. The method for fabrication of a semiconductor sensor according to claim 1, wherein the adjusting of the contact portion modifies a size or shape of the contact portion.

4. The method for fabrication of a semiconductor sensor according to claim 1, wherein the forming of the gauge resistor includes forming a plurality of gauge resistors in a bridge circuit.

5. The method for fabrication of a semiconductor sensor according to claim 4, wherein the plurality of gauge resistors form a full bridge circuit.

6. The method for fabrication of a semiconductor sensor according to claim 1, wherein the adjusting of the contact portion adjusts the contact portion on all chip areas of the semiconductor substrate equally.

7. The method for fabrication of a semiconductor sensor according to claim 1, wherein the adjusting of the contact portion individually adjusts the contact portion on each chip area of the semiconductor substrate chip-by-chip.

8. The method for fabrication of a semiconductor sensor according to claim 1, wherein the gauge resistor has a narrow portion and a wide portion, and the contact portion is formed on the wide portion.

9. A method for fabrication of a semiconductor sensor comprising:

forming a gauge resistor on each chip area of a semiconductor substrate having a plurality of chip areas, the gauge resistor having a contact portion to electrically contact an electrode;

measuring a resistance of the gauge resistor; and adjusting the contact portion of the gauge resistor based on the resistance of the gauge resistor;

wherein the adjusting of the contact portion adjusts the contact portion on all chip areas of the semiconductor substrate equally;

wherein the forming of the gauge resistor uses a gauge photomask to form the gauge resistor, and a contact photomask to form the contact portion; and wherein the adjusting of the contact portion includes modifying the contact photomask, then using the modified contact photomask to form chip areas.

10. The method for fabrication of a semiconductor sensor according to claim 1, wherein the semiconductor sensor is a semiconductor acceleration sensor.

11. A method for fabrication of a semiconductor sensor comprising:

forming a gauge resistor on each chip area of a semiconductor substrate having a plurality of chip areas, the gauge resistor having a contact portion to electrically contact an electrode;

measuring a resistance of the gauge resistor;

adjusting the contact portion of the gauge resistor based on the resistance of the gauge resistor; and providing information concerning the expected offset voltage or the amount of the adjustment of the offset voltage of each chip on the semiconductor substrate on each chip.

12. The method for fabrication of a semiconductor sensor according to claim 11, wherein the adjusting of the contact portion includes the providing of the information concerning the expected offset voltage or the amount of the adjustment of the offset voltage for each chip.

13. A method for fabrication of a semiconductor sensor comprising:

forming a gauge resistor on each chip area of a semiconductor substrate having a plurality of chip areas, the gauge resistor having a contact portion to electrically contact an electrode;

measuring a resistance of the gauge resistor;

adjusting the contact portion of the gauge resistor based on the resistance of the gauge resistor; and providing information regarding an amount of the adjustment of the contact portion on each chip.

14. The method for fabrication of a semiconductor sensor according to claim 13, wherein the adjusting of the contact portion includes the providing of the information for each chip.

15. A method for fabrication of a semiconductor sensor comprising:

forming gauge resistors on each chip area of a semiconductor substrate having a plurality of chip areas, the gauge resistors forming a circuit forming an electrode on the gauge resistor with an insulating film interposed therebetween, the insulating film having a contact portion through which the gauge resistor electrically connects with the electrode;

measuring an output of the circuit formed by the gauge resistors via the electrode; and adjusting the contact portions of the insulating film of selected ones of the gauge resistors on each chip area based on the output of the circuit.

16. The method for fabrication of a semiconductor sensor according to claim 15, wherein the adjusting of the contact portions adjusts positions of the contact portions of the selected gauge resistors.

17. The method for fabrication of a semiconductor sensor according to claim 15, wherein the adjusting of the contact portions adjusts size and/or shape of the contact portions of the selected gauge resistors.

18. The method for fabrication of a semiconductor sensor according to claim 15, wherein the circuit formed by the gauge resistors is a bridge circuit.

19. The method for fabrication of a semiconductor sensor according to claim 18, wherein the bridge circuit is a full bridge circuit.

20. The method for fabrication of a semiconductor sensor according to claim 15, wherein the adjusting of the contact portions adjusts the contact portions of the selected gauge resistors for all chip areas equally.

21. The method for fabrication of a semiconductor sensor according to claim 15, wherein the adjusting of the contact portions adjusts the contact portions of the selected gauge resistors on each chip area separately for each chip.

22. The method for fabrication of a semiconductor sensor according to claim 15, wherein the gauge resistors have narrow portions and wide portions, and the contact portions are formed on the wide portions.

23. A method for fabrication of a semiconductor sensor comprising:

forming gauge resistors on each chip area of a semiconductor substrate having a plurality of chip areas, the gauge resistors forming a circuit and having contact portions to electrically contact with electrodes;

measuring an output of the circuit formed by the gauge resistors; and adjusting the contact portions of selected ones of the gauge resistors on each chip area based on the output of the circuit;

wherein:

the forming of the gauge resistors uses a gauge photomask to form the gauge resistors and a contact photomask to form the contact portions; and the adjusting of the contact portions includes modifying the contact photomask, then adjusting the contact portion by using the modified contact photomask.

24. The method for fabrication of a semiconductor sensor according to claim 15, wherein the semiconductor sensor is a semiconductor acceleration sensor.

25. A method for fabrication of a semiconductor sensor comprising:

forming gauge resistors on each chip area of a semiconductor substrate having a plurality of chip areas, the gauge resistors forming a circuit and having contact portions to electrically contact with electrodes;

measuring an output of the circuit formed by the gauge resistors;

adjusting the contact portions of selected ones of the gauge resistors on each chip area based on the output of the circuit; and providing information to identify a position of each chip on the semiconductor substrate on each chip.

26. The method for fabrication of a semiconductor sensor according to claim 25, -wherein the adjusting of the contact portions includes the providing of the information for each chip.

27. A method for fabrication of a semiconductor sensor comprising:

forming gauge resistors on each chip area of a semiconductor substrate having a plurality of chip areas, the gauge resistors forming a circuit and having contact portions to electrically contact with electrodes;

measuring an output of the circuit formed by the gauge resistors;

adjusting the contact portions of selected ones of the gauge resistors on each chip area based on the output of the circuit; and providing information regarding amounts of adjustment of the contact portions on each chip.

28. The method for fabrication of a semiconductor sensor according to claim 27, wherein the adjusting of the contact portions includes the providing of the information for each chip.

29. A method for fabrication of a semiconductor sensor comprising:

forming a gauge resistor on each chip area of a semiconductor substrate having a plurality of chip areas forming an electrode on the gauge resistor with an insulating film interposed therebetween the insulating film having contact portions through which the gauge resistor electrically connects with the electrode;

measuring a resistance of the gauge resistor via the electrode; and adjusting the contact portions of the insulating film so that the resistance of the gauge resistor between both contact portions changes.

30. The method for fabrication of a semiconductor sensor according to claim 1, wherein:

the semiconductor substrate is formed in a wafer; and the measuring the resistance of the gauge resistor and the adjusting the contact portion are performed before the wafer is divided into plural chips.

31. The method for fabrication of a semiconductor sensor according to claim 1 wherein the step of adjusting the contact portion including adjusting a mask for fabricating the contact portion.

32. A method for fabrication of a semiconductor sensor comprising:

forming a gauge resistor on each chip area of a semiconductor substrate having a plurality of chip areas, the gauge resistor having a contact portion to electrically contact an electrode;

measuring a resistance of the gauge resistor; and adjusting the contact portion of the gauge resistor based on the resistance of the gauge resistor;

forming another gauge resistor on each chip area of another semiconductor substrate having a plurality of chip areas;

forming an electrode on said another gauge resistor with another insulating film interposed therebetween, said another insulating film having an adjusted contact portion whose position and shape are adjusted in the step of adjusting the contact portion.

33. The method for fabrication of a semiconductor sensor according to claim 32, wherein the adjusting of the contact portion shifts a position of the contact portion.

34. The method for fabrication of a semiconductor sensor according to claim 32, wherein the adjusting of the contact portion modifies a size or shape of the contact portion.

35. The method for fabrication of a semiconductor sensor according to claim 32, wherein the forming of the gauge resistor includes forming a plurality of gauge resistors in a bridge circuit.

36. The method for fabrication of a semiconductor sensor according to claim 35, wherein the plurality of gauge resistors form a full bridge circuit.

37. The method for fabrication of a semiconductor sensor according to claim 32, wherein the adjusting of the contact portion adjusts the contact portion on all chip areas of the semiconductor substrate equally.

38. The method for fabrication of a semiconductor sensor according to claim 32, wherein the adjusting of the contact portion individually adjusts the contact portion on each chip area of the semiconductor substrate chip-by-chip.

39. The method for fabrication of a semiconductor sensor according to claim 32, wherein the gauge resistor has a narrow portion and a wide portion, and the contact portion is formed on the wide portion.

40. The method for fabrication of a semiconductor sensor according to claim 37, wherein:

the forming of the gauge resistor uses a gauge photomask to form the gauge resistor, and a contact photomask to form the contact portion; and the adjusting of the contact portion includes modifying the contact photomask, then using the modified contact photomask to form chip areas.

41. A method for fabrication of a semiconductor sensor comprising:

forming a gauge resistor on each chip area of a semiconductor substrate having a plurality of chip areas, the gauge resistor having a contact portion to electrically contact an electrode;

measuring an output of the circuit formed by the gauge resistors;

adjusting the contact portions of selected ones of the gauge resistors on each chip area based on the output of the circuit;

forming another gauge resistor on each chip area of another semiconductor substrate having a plurality of chip areas; and forming an electrode on said another gauge resistor with another insulating film interposed therebetween, said another insulating film having an adjusted contact portion whose position and shape are adjusted in the step of adjusting the contact portion.

42. A method for fabricating a semiconductor sensor, the method comprising:

providing a semiconductor substrate comprising a plurality of chip areas on a given surface thereof;

forming a gauge resistor on each said chip area of said semiconductor substrate;

electrically connecting an electrode to a given said gauge resistor via a contact portion of an insulating film interposed between said given gauge resistor and a corresponding said electrode;

measuring a resistance of said given gauge resistor; and adjusting the contact portion in contact with said given gauge resistor based on the resistance of said given gauge resistor.

* * * * *